US008985957B2

(12) United States Patent
Mahle et al.

(10) Patent No.: US 8,985,957 B2
(45) Date of Patent: *Mar. 24, 2015

(54) BLADE CHANNEL HAVING AN END WALL CONTOUR AND A TURBOMACHINE

(75) Inventors: Inga Mahle, Munich (DE); Michaela Niebler, Munich (DE)

(73) Assignee: MTU Aero Engines GmbH, Munich (DE)

( * ) Notice: Subject to any disclaimer, the term of this patent is extended or adjusted under 35 U.S.C. 154(b) by 462 days.

This patent is subject to a terminal disclaimer.

(21) Appl. No.: 13/367,972

(22) Filed: Feb. 7, 2012

(65) Prior Publication Data

US 2012/0201688 A1 Aug. 9, 2012

(30) Foreign Application Priority Data

Feb. 8, 2011 (EP) ...................................... 11153627

(51) Int. Cl.
| B63H 1/16 | (2006.01) |
| F01D 5/30 | (2006.01) |
| B64C 11/00 | (2006.01) |
| F01D 5/14 | (2006.01) |

(52) U.S. Cl.
CPC ................ F01D 5/143 (2013.01); F01D 5/145 (2013.01); *Y02T 50/673* (2013.01)
USPC .................... 416/193 R; 416/193 A

(58) Field of Classification Search
CPC .................................. F01D 5/143; F01D 5/145
USPC ........... 416/189, 191, 193 A, 193 R, 228, 235
See application file for complete search history.

(56) References Cited

U.S. PATENT DOCUMENTS

| 2007/0059177 | A1* | 3/2007 | Harvey .......................... 416/179 |
| 2007/0258810 | A1* | 11/2007 | Aotsuka et al. ................ 415/206 |
| 2007/0258818 | A1 | 11/2007 | Allen-Bradley et al. |
| 2007/0258819 | A1* | 11/2007 | Allen-Bradley et al. . 416/193 A |
| 2010/0166558 | A1* | 7/2010 | Siden et al. ................ 416/193 R |
| 2010/0196154 | A1* | 8/2010 | Sakamoto et al. .......... 415/208.2 |
| 2011/0044818 | A1* | 2/2011 | Kuhne et al. ............... 416/212 A |
| 2011/0189023 | A1 | 8/2011 | Guimbard et al. ......... 416/223 R |

FOREIGN PATENT DOCUMENTS

| EP | 1 681 438 A2 | 7/2006 |
| EP | 1 712 737 A1 | 10/2006 |
| EP | 1 762 700 A2 | 3/2007 |
| EP | 1 955 410 A1 | 8/2008 |
| EP | 2 136 033 A1 | 12/2009 |
| EP | 220 45 35 | 7/2010 |
| EP | 2458148 | 5/2012 |
| GB | 944 166 | 12/1963 |
| WO | WO 2007/065168 A1 | 6/2007 |
| WO | WO 2009/112776 A2 | 9/2009 |
| WO | WO 2010/068391 A2 | 6/2010 |

* cited by examiner

*Primary Examiner* — Dwayne J White
*Assistant Examiner* — Brian P Wolcott
(74) *Attorney, Agent, or Firm* — Davidson, Davidson & Kappel, LLC

(57) ABSTRACT

A blade channel having a not-axially-symmetric end wall contour in a turbomachine is disclosed, the end wall contour having at least one individual contour in the form of an elevation, on the pressure side, and at least three individual contours in the form of two recesses and one elevation, on the suction side, the elevation being situated between the recesses in the flow direction; a turbomachine having a plurality of blade channels of this type is also disclosed.

13 Claims, 3 Drawing Sheets

BLADE CHANNEL HAVING AN END WALL CONTOUR AND A TURBOMACHINE

This claims the benefit of European Patent Application EP 11 153 627.2, filed Feb. 8, 2011, and hereby incorporated by reference herein.

The present invention relates to a blade channel having an end wall contour in a turbomachine, and a turbomachine having blade channels of this type.

BACKGROUND

A fluid flow guided through a flow channel is deflected by a lateral pressure gradient in parallel to the end walls. Since the flow layers adjacent to the wall are deflected due to their lower speed to a greater extent than the flow layers at a distance from the wall, a secondary flow is formed which is superimposed on a main flow, thus resulting in pressure losses, among other things. Secondary flows of this type regularly occur in blade cascades of turbomachines, such as gas and steam turbines. The blade cascades include a plurality of blades or vanes which are situated next to one another in the circumferential direction and which are situated in a rotary-symmetric flow channel, and between which a blade channel is provided in which the secondary flows form when the fluid flows through. In the radial direction, the blade channels are each delimited by a radially outer housing-side end wall (outer boundary wall) and by a radially inner hub-side end wall (inner boundary wall). The boundary walls are formed by a stationary housing section, by a rotor section, by radially inner blade cover plates and/or by radially outer blade cover plates. In the circumferential direction, the blade channels are each delimited by a pressure side and a suction side blade wall. To reduce the secondary flows and channel eddies, contours in the form of elevations and/or recesses for influencing the flow are often introduced into the end walls.

A plurality of end wall contours is known from the related art. In WO 2010/068391 A2, EP 1 681 438 A2 and EP 1 712 737 A1, it is proposed, for example, to provide an elevation on the pressure side of the blade and a recess on the suction side of the blade. In contrast, in EP 1 955 410 A1 and EP 2 136 033 A1, it is proposed to situate an elevation on the pressure side as well as on the suction side. The end wall contour of EP 1 762 700 A2 provides that two pressure-side elevations and one recess extending between the elevations in the circumferential direction are provided. The end wall contour of WO 2009/112776 A2 provides that one recess and elevation each are provided on the suction and the pressure sides. These known end wall contours result in a reduction of the secondary flows, but there is a lot of room for improvement.

SUMMARY OF THE INVENTION

It is an object of the present invention to provide a blade channel having an end wall contour in a turbomachine having a reduced secondary flow, as well as a turbomachine having an improved efficiency.

The present invention provides a blade channel having an end wall contour in a turbomachine and a turbomachine.

A blade channel according to the present invention having an end wall contour in a turbomachine is delimited by a pressure-side wall of a first blade in the circumferential direction and by an opposite suction-side wall of an adjoining second blade. In the radial direction, the blade channel is delimited by two opposite boundary walls, at least one of the boundary walls having at least one pressure-side elevation in the area of the pressure-side blade wall. According to the present invention, at least two suction-side recesses and at least one suction-side elevation are provided on the elevation-side boundary wall in the area of the suction-side blade wall, the suction-side elevation being situated between the recesses, viewed in the flow direction. As a result of the end wall contour, which is not axially symmetric according to the present invention, a static pressure field is influenced on the at least one boundary wall and on the blade walls in the boundary area in such a way that a secondary flow is reduced, thus reducing the flow losses and improving a flow toward a downstream blade cascade.

The elevations and recesses are preferably implemented locally and at a distance from one another. As a result, not-contoured boundary wall sections between the elevations and the recesses are formed, thus positively influencing the flow characteristics.

In particular, the elevations may be at least approximately situated opposite one another, viewed in the circumferential direction, so that a cross-sectionally tapered blade channel section may be formed between the elevations in principle.

The elevations and recesses each have a highest and lowest section, respectively, which is preferably at a distance from the blade walls. The particular section may, however, directly adjoin the appropriate blade walls. However, it is preferred that the highest sections and the lowest sections be situated downstream in front of a blade-side transition point.

In one preferred exemplary embodiment, the pressure-side elevation is in contact with the pressure-side blade wall and extends along the latter upstream up to or into an area of a front edge of the first blade. Here, it is particularly advantageous if the anterior recess is in contact with the suction-side blade wall and extends upstream over and beyond a front edge of the second blade.

In one alternative preferred exemplary embodiment, the pressure-side elevation is in contact with the pressure-side blade wall and extends upstream over and beyond the front edge of the first blade. In this case, it is advantageous if the anterior recess is situated upstream in front of the front edge of the second blade and is thus at a distance from the latter. The effect of this end wall contour may thus be improved if the posterior recess is situated in an area between the elevations. Moreover, it is advantageous in this exemplary embodiment if the longitudinal axes of the pressure-side elevation and the recesses are oriented essentially in the flow direction.

In both preferred exemplary embodiments it is preferred if the suction-side elevation and the posterior recess are in contact with the suction-side blade wall.

A turbomachine according to the present invention has at least one blade cascade having a plurality of blade channels according to the present invention. As a result of the reduced secondary flow and channel eddies, a turbomachine of this type distinguishes itself by an improved efficiency.

Other advantageous exemplary embodiments of the present invention are the subject matter of the other subclaims.

BRIEF DESCRIPTION OF THE DRAWINGS

In the following, preferred exemplary embodiments of the present invention are elucidated in greater detail with reference to the highly simplified schematic illustrations.

DETAILED DESCRIPTION

Figure 1:
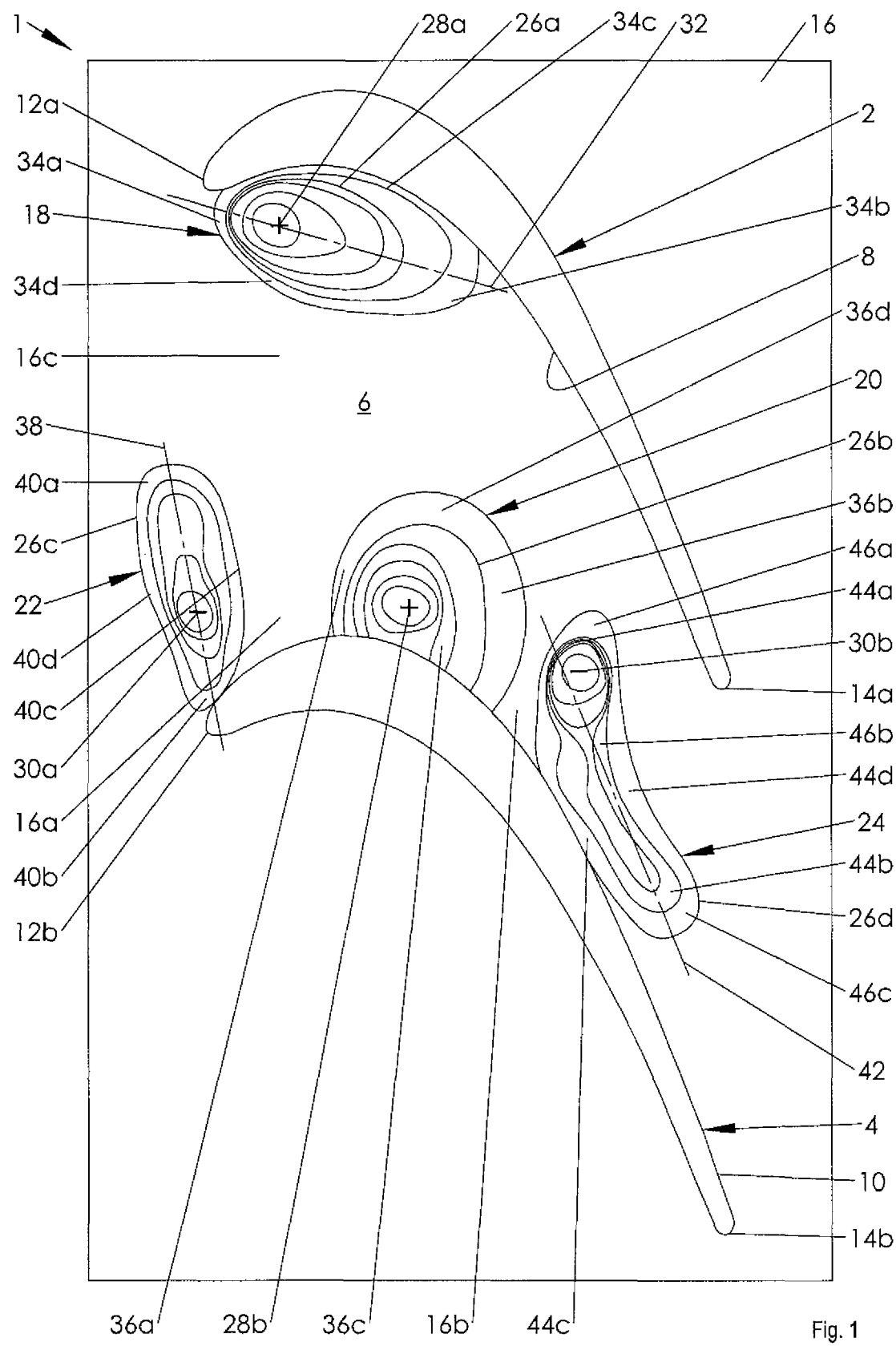
FIG. 1 shows a top view of an angled and cut blade cascade section of a first exemplary embodiment according to the present invention.

The two exemplary embodiments are each elucidated based on a blade cascade of an axial low-pressure turbine. The present invention is, however, also used for compressor rows or turbine rows in radial and diagonal designs FIG. 1 shows a top view of a sectional illustration of a circumferential section, which is angled in a plane, of a first low-pressure-turbine-side blade cascade 1 according to the present invention of an axial turbomachine 100 (FIG. 3), such as a stationary gas turbine or a jet engine.

Blade cascade 1 has a plurality of blades 2, 4 which are situated adjacently to one another in the circumferential direction and each delimit a blade channel 6 in which a main flow is formed. In the circumferential direction, blade channel 6 is formed by a pressure-side wall 8 of first blade 2 and by an opposite suction-side wall 10 of second blade 4, each of which extends between a front edge 12a, 12b and a rear edge 14a, 14b of blades 2, 4. In the radial direction, blade channel 6 is delimited by a hub-side end wall or an inner boundary wall 16. Moreover, blade channel 6 is delimited in the radial direction by a housing-side end wall or outer boundary wall 116 (FIG. 3), which is not illustrated due to the section view. Inner boundary wall 16 is formed by a rotor section or a blade-root-side platform, i.e. an inner shroud, for example. The outer boundary wall 116 is formed by a housing section or a blade-tip-side outer shroud, for example, and may have a design which is similar to inner boundary wall 16.

In the area of blade channel 6, at least inner boundary wall 16 is provided with a not-axially-symmetric end wall contour in the form of a pressure-side elevation 18, a suction-side elevation 20, and an anterior suction-side recess 22, viewed in the flow direction, and a posterior recess 24, which is situated downstream from suction-side elevation 20. Individual contours 18, 20, 22, 24 may, however, also be provided only in the area of the housing-side boundary wall or in the area of the two boundary walls. They are illustrated by a plurality of contour lines and depth contour lines 26a through 26d having a plus sign as highest section 28a, 28b or a minus sign as lowest section 30a, 30b. Sections 28a, 28b and 30a, 30b may have uniform highs and lows or different highs and lows. Individual contours 18, 20, 22, 24 have different geometries and are situated upstream in front of a suction-side transition point (no reference numeral given). They are at a distance from each other so that, in each case, a surface section 16a, 16b, 16c, which follows the original profile of boundary wall 16, is created between suction-side individual contours 20, 22, 24 and between suction-side individual contours 20, 22, 24 and pressure-side individual contour 18.

Pressure-side elevation 18 has an oval or lens-shaped cross section and its longitudinal axis 32 is oriented approximately in the direction of the main flow. This pressure-side elevation 18 is positioned in the flow direction downstream from front edge 12a of first blade 2 and its highest section 28a, which is situated in an anterior elevation area, is at a distance from blade wall 8. As a result, a steeply ascending front face flank 34a and a planarly descending rear flank 34b are formed, viewed in the flow direction. Their side flanks 34c, 34d are identical or almost identical so that elevation 18 is implemented virtually mirror-symmetrically to longitudinal axis 32. In this case, its root-side section of side flank 34c is in contact with pressure-side blade wall 8 in such a way that a flow channel section (no reference numeral given) is formed between side flank 34c and blade wall 8.

Suction-side elevation 20 is situated in the area of second blade 4 opposite pressure-side elevation 18 so that a cross-sectionally tapered blade channel section (no reference numeral given) is created in the area of inner boundary wall 16 between elevations 18, 20. Compared to pressure-side elevation 18, suction-side elevation 20 has a circular cross section having a highest section 28b, which is positioned approximately concentrically at a distance from blade wall 10. Its base area approximately corresponds to the base area of pressure-side elevation 18. This base area of elevation 20 has a geometry, which is approximately cone-shaped, having a steeply ascending circumferential flank section 36a on the front-face side and a planarly descending rear circumferential flank section 36b. Its root-side circumferential flank section 36c is in contact with suction-side blade wall 10 in such a way that this circumferential flank section has a convex design to match blade wall 10, a flow channel section (no reference numeral given) being formed between circumferential flank section 36c and blade wall 10. A circumferential flank section 36d, which is facing away from end wall 10 and extends between front-face-side circumferential flank section 36a and rear circumferential flank section 36b, has a concave design to match these circumferential flank sections 36a, 36b.

Anterior recess 22 is introduced in the area of front edge 12b of second blade 4 into inner boundary wall 16. Its opening has an oval cross section having an opening area which is smaller than the base area of pressure-side elevation 18. Its longitudinal axis 38 is almost orthogonally oriented to blade wall 10 and thus essentially transversely to the main flow. Its descending front face flank 40a is at a distance from suction-side end wall 10 and is in contact therewith the opening-side section of its rear flank 40b. It thus protrudes transversely into blade channel 6, its lowest section 30a being situated in a central recess area and is offset approximately into the direction of blade wall 10. Thus, its descending front face flank 40a is more flat than its ascending rear flank 40b. Its side flanks 40b, 40c are almost identical so that anterior recess 22 is implemented virtually mirror-symmetrically to its longitudinal axis 38.

Posterior recess 24 is situated downstream from suction-side elevation 20 in the area of second blade 4. Its opening has a kidney-shaped cross section having an opening area which is larger than the opening area of anterior recess 22. Its opening area approximately corresponds to the base area of suction-side elevation 20. Its longitudinal axis 42 is approximately oriented in the direction of the main flow and posterior recess 24 has an anterior area 46a, a central area 46b and a posterior area 46c. Its opening-side section of a concave side flank 44c of central area 46b is in contact with suction-side blade wall 10 and its anterior area 46a and its posterior area 46c are at a distance therefrom. Its lowest section 30b is positioned in anterior area 46a. It has a steeply descending front face flank 44a and a planarly ascending rear flank 44b between which central recess area 46b extends, having an approximately constant depth. Its side flanks 44c, 44d have an approximately similar profile, except for the convex or concave curvature, so that posterior recess 24 has an approximately constant width.

Figure 2:
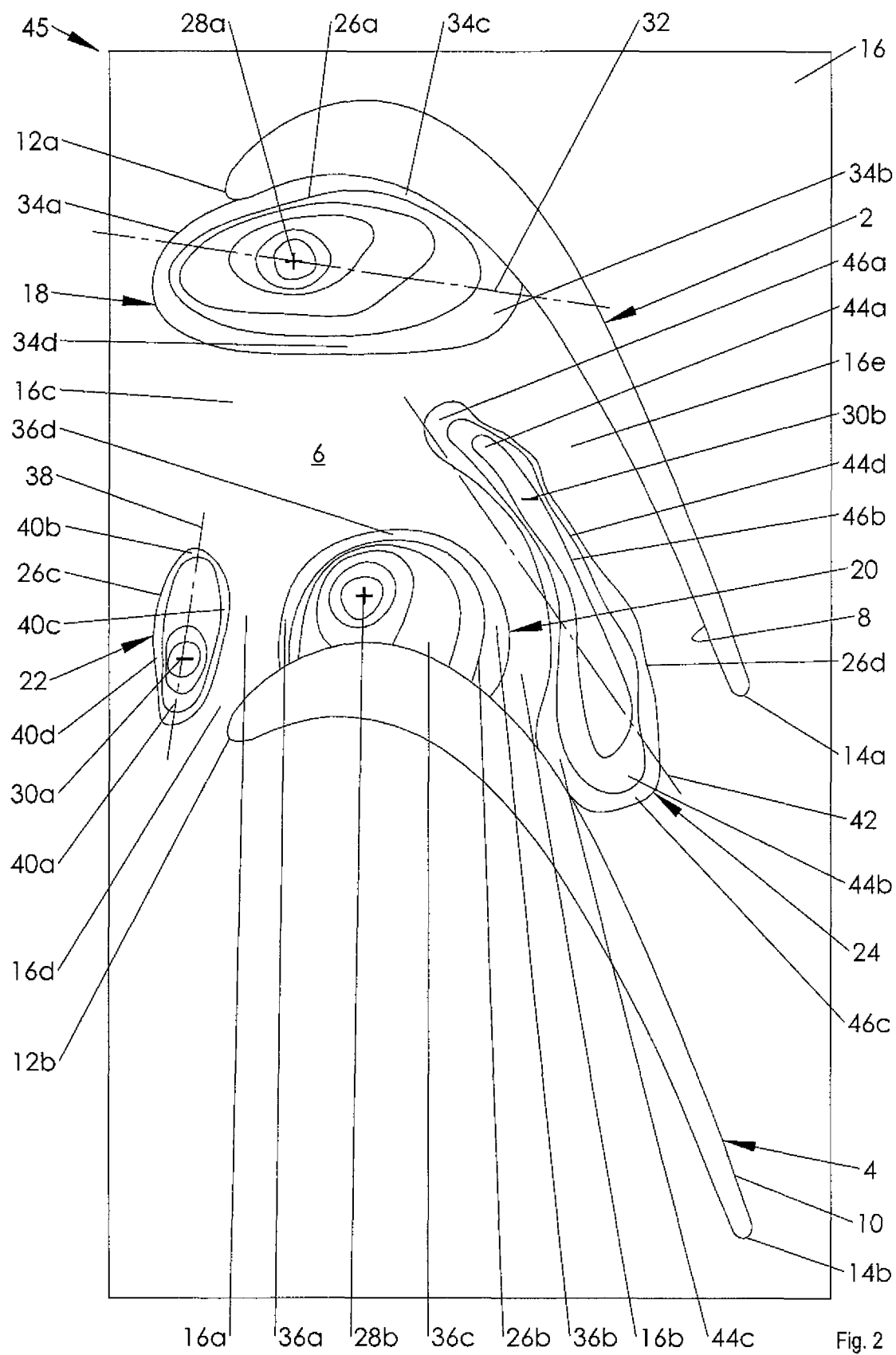
FIG. 2 shows a top view of an angled and cut blade cascade section of a second exemplary embodiment according to the present invention.

FIG. 2 shows a top view of a sectional illustration of a circumferential section, which is angled in a plane, of a second low-pressure-side blade cascade 45 according to the present invention of an axial turbomachine, such as a stationary gas turbine or a jet engine.

Figure 3:
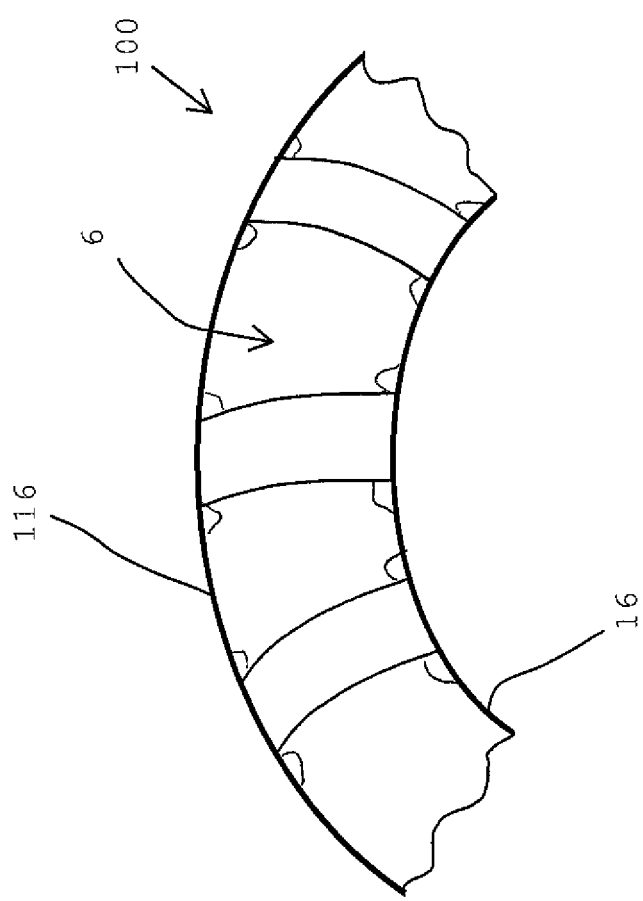
FIG. 3 shows a schematic view of a partial cross-section of a turbomachine showing blade channels 6.

Blade cascade 45 has, according to first blade cascade 1, a plurality of blades 2, 4, which are adjacently situated in the circumferential direction and whose opposite blade walls 8, 10, each of which extends between a front edge 12a, 12b and a rear edge 14a, 14b, each form a blade channel 6, in which a main flow is implemented, together with a radial inner boundary wall 16 and a radial outer boundary wall 116 (FIG. 3).

At least inner boundary wall 16 of blade channel 6 is preferably provided with a not-axially-symmetric end wall contour in the form of a pressure-side elevation 18, a suction-side elevation 20, and an anterior suction-side recess 22, viewed in the flow direction, and a posterior suction-side recess 24, which is situated downstream from suction-side elevation 20. Individual contours 18, 20, 22, 24 may, however, also be provided only in the area of the housing-side outer boundary wall or in the area of the two boundary walls. They are illustrated by a plurality of contour lines and depth contour lines 26a through 26d, each having a plus sign as highest section 28a, 28b or a minus sign as lowest section 30a, 30b. Sections 28a, 28b and 30a, 30b may have uniform highs and lows or different highs and lows. Individual contours 18, 20, 22, 24 have different geometries and are situated upstream in front of a suction-side transition point. They are at a distance from each other so that, in each case, a surface section 16a, 16b, 16c, which follows the original profile of boundary wall 16, is created between suction-side individual contours 20, 22, 24 and between suction-side individual contours 20, 22, 24 and pressure-side individual contours 18.

Pressure-side elevation 18 has an approximately oval cross section and its longitudinal axis 32 is oriented approximately in the direction of the main flow. This pressure-side elevation extends over and beyond front edge 12a of first blade 2, viewed upstream, and its root-side section of a side flank 34c is in contact with pressure-side blade wall 8. Its highest section 28a is at such a distance from blade wall 8 that a flow channel section is formed between blade wall 8 and side flank 34c. Highest section 28a is situated concentrically to elevation 18 and is slightly offset in the direction of front edge 12a, whereby side flank 34c ascends steeper than its opposite side flank 34d. Its ascending front face flank 34a and its descending rear flank 34b are implemented almost identically.

Suction-side elevation 20 is situated in the area of second blade 4 opposite pressure-side elevation 18 so that a cross-sectionally tapered blade channel section (no reference numeral given) is created in the area of inner boundary wall 16 between elevations 18, 20. Compared to pressure-side elevation 18, this suction-side elevation has a circular cross section having a highest section 28b, which is at a distance from blade wall 10 and is offset upstream. Suction-side elevation 20 is smaller than the base area of pressure-side elevation 18. The base area has a geometry, which is approximately cone-shaped, having a steeply ascending circumferential flank section 36a on the front-face side and a planarly descending rear circumferential flank section 36b. Its root-side circumferential flank section 36c is in contact with suction-side blade wall 10 in such a way that this circumferential flank section has a convex design to match blade wall 10, a flow channel section being formed between circumferential flank section 36c and blade wall 10. A circumferential flank section 36d, which is facing away from end wall 10 and extends between front-face-side circumferential flank section 36a and rear circumferential flank section 36b, has a concave design to match these circumferential flank sections 36a, 36b.

Anterior recess 22 is introduced upstream from suction-side elevation 20 and upstream from front edge 12b of second blade 4 into inner boundary wall 16. Anterior recess 22 is thus at a distance from blade 4 over an area section 16d of inner boundary wall 16. Its opening has an oval cross section having an opening area which is smaller than the particular base area of elevations 18, and an opening area of posterior recess 24. Its longitudinal axis 38 is oriented essentially in the direction of the main flow. Its lowest section 30a is situated in a central recess area and is slightly offset in the direction of blade 4, whereby its front face flank 40a, which is adjacent to the blade, is steeper than its rear flank 40b, which is at a distance from the blade. Its side flanks 40c, 40d are almost identical so that recess 22 is implemented virtually mirror-symmetrically to its longitudinal axis 38.

Posterior recess 24 is situated downstream from suction-side elevation 20 in the area of second blade 4. Its opening has a pear-shaped cross section having an opening area which is larger than the opening area of anterior recess 22 and corresponds approximately to the base area of pressure-side elevation 18. Its longitudinal axis 42 is oriented approximately in the direction of the main flow and posterior recess 24 has a central recess area 46b which transitions upstream into a cross-sectionally tapered anterior recess area 46a and downstream into a cross-sectionally expanded posterior recess area 46c. One of its opening-side sections of side flank 44c of posterior area 46c is in contact with suction-side blade wall 10 and its anterior area 46a, which has lowest section 30b, extends between elevations 18, 20. As a result, surface section 16b has an approximately constant width between posterior recess 24 and suction-side elevation 20. Likewise, this results in a surface area 16e, having an approximately constant width, being created between posterior recess 24 and pressure-side blade wall 8. Central recess area 46b has an approximately constant depth. Its side flanks 44c, 44d have an approximately similar profile, except for the convex or concave curvature, so that posterior recess 24 has an approximately constant width. Its descending front face flank 44a and its ascending rear flank 44b are implemented almost identically. Likewise, its side flanks 44c, 44d have an approximately similar profile, except for the convex or concave curvature.

A blade channel having a not-axially-symmetric end wall contour in a turbomachine is disclosed, the end wall contour having at least one individual contour in the form of an elevation, on the pressure side, and at least three individual contours in the form of two recesses and one elevation, on the suction side, the elevation being situated between the recesses in the flow direction; a turbomachine having a plurality of blade channels of this type is also disclosed.

LIST OF REFERENCE NUMERALS 1 blade cascade
2 blade
4 blade
6 blade channel
8 pressure-side blade wall
10 suction-side blade wall
12a, 12b front edge
14a, 12b rear edge
16 inner boundary wall
16a, 16b, 16c, 16d, 16e surface section
18 pressure-side elevation
20 suction-side elevation
22 anterior recess
24 posterior recess
26a, 26b, 26c, 26d line
28a, 28b highest section
30a, 30b lowest section
32 longitudinal axis
34a, 34b, 34c, 34d flank of the pressure-side elevation
36a, 36b, 36c, 36d flank of the suction-side elevation
38 longitudinal axis
40a, 40b, 40c, 40d flank of the anterior recess 42 longitudinal axis
44a, 44b, 44c, 44d flank of the posterior recess
45 blade cascade
46a, 46b, 46c area of the posterior recess

What is claimed is:

1. A blade channel having an end wall contour in a turbomachine comprising:
   a pressure-side wall of a first blade;
   an opposite suction-side wall of an adjoining second blade in a circumferential direction; and
   two opposite boundary walls in a radial direction, the pressure side-wall, the suction side wall and the two opposite boundary walls delimiting a channel,
   at least one of the boundary walls having at least one pressure-side elevation in an area of the pressure-side blade wall,
   the at least one boundary wall having at least two suction-side recesses and at least one suction-side elevation in an area of the suction-side blade wall, the suction-side elevation being situated between the at least two suction-side recesses, viewed in a flow direction.

2. The blade channel as recited in claim 1 wherein the pressure-side elevation and the suction-side elevations and the at least two suction-side recesses are implemented locally and at a distance from one another.

3. The blade channel as recited in claim 1 wherein the pressure-side and suction-side elevations are situated opposite one another.

4. The blade channel as recited in claim 1 wherein a high point of the pressure-side and suction-side elevations or low point of the suction side recesses are at a distance from the pressure-side and suction side walls.

5. The blade channel as recited in claim 1 wherein a high point of the pressure-side and suction-side elevations or low point of the suction side recesses are situated downstream in front of a blade-side transition point.

6. The blade channel as recited in claim 1 wherein the pressure-side elevation is in contact with the pressure-side blade wall and extends up to a front edge of the first blade.

7. The blade channel as recited in claim 6 wherein one of the suction-side recesses is anterior to another of the suction side recesses and is in contact with the suction-side blade wall and extends upstream over and beyond a front edge of the second blade.

8. The blade channel as recited in claim 1 wherein the pressure-side elevation is in contact with the pressure-side blade wall and extends upstream over and beyond a front edge of the first blade.

9. The blade channel as recited in claim 8 wherein one of the suction-side recesses is anterior to another of the suction side recesses and is situated upstream in front of the front edge of the second blade.

10. The blade channel as recited in claim 8 wherein one of the suction-side recesses is posterior to another of the suction side recesses and extends between the pressure-side and suction-side elevations.

11. The blade channel as recited in claim 8 wherein the pressure-side elevation and longitudinal axes of the recesses are oriented essentially in the flow direction.

12. The blade channel as recited in claim 1 wherein one of the suction-side recesses is posterior to another of the suction side recesses and the suction-side elevation, and is in contact with the suction-side blade wall.

13. A turbomachine comprising at least one blade cascade having a plurality of blade channels, each blade channel of the plurality of the blade channels comprising:
   a pressure-side wall of a first blade;
   an opposite suction-side wall of an adjoining second blade in a circumferential direction; and
   two opposite boundary walls in a radial direction, the pressure side-wall, the suction side wall and the two opposite boundary walls delimiting a channel,
   at least one of the boundary walls having at least one pressure-side elevation in an area of the pressure-side blade wall,
   the at least one boundary wall having at least two suction-side recesses and at least one suction-side elevation in an area of the suction-side blade wall, the suction-side elevation being situated between the at least two suction-side recesses, viewed in a flow direction.

* * * * *